United States Patent
Baltes

(10) Patent No.: US 7,404,028 B2
(45) Date of Patent: Jul. 22, 2008

(54) ECU IDENTIFICATION RETENTION ACROSS REPROGRAMMING EVENTS

(75) Inventor: Kevin M. Baltes, Wixom, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 293 days.

(21) Appl. No.: 11/170,990

(22) Filed: Jun. 30, 2005

(65) Prior Publication Data

US 2007/0005873 A1   Jan. 4, 2007

(51) Int. Cl.
*G06F 12/00* (2006.01)
*G06F 13/00* (2006.01)

(52) U.S. Cl. ........................ 711/103; 711/100; 711/154; 365/185.33

(58) Field of Classification Search ................. 711/100, 711/103, 154; 365/185.33
See application file for complete search history.

(56) References Cited

U.S. PATENT DOCUMENTS

| | | | | |
|---|---|---|---|---|
| 5,365,477 A | * | 11/1994 | Cooper et al. | 365/174 |
| 5,450,589 A | * | 9/1995 | Maebayashi et al. | 717/170 |
| 5,465,249 A | * | 11/1995 | Cooper et al. | 365/149 |
| 6,353,553 B1 | * | 3/2002 | Tamada et al. | 365/185.03 |
| 2001/0037388 A1 | * | 11/2001 | Suzuki | 709/225 |
| 2003/0233558 A1 | * | 12/2003 | Lieberman et al. | 713/189 |

* cited by examiner

*Primary Examiner*—Tuan V. Thai

(57) ABSTRACT

A memory system for a vehicle includes a first memory that is non-volatile, that is rewritable, and that stores a control program and identification data. A second memory is non-volatile. A control module transfers the identification data to the second memory, erases the first memory, rewrites the control program to the first memory, and transfers the identification data from the second memory to the first memory after erasing the first memory. The identification data may include data such as a software version identifier, a programming date, and/or a part number.

15 Claims, 4 Drawing Sheets

ECU IDENTIFICATION RETENTION ACROSS REPROGRAMMING EVENTS

FIELD OF THE INVENTION

The present invention relates to vehicle control modules, and more particularly to a method for storing identification data in memory of a control module for an automotive vehicle.

BACKGROUND OF THE INVENTION

Control modules are used to control the operation of one or more components of a vehicle. For example, the control module may function as an engine control module that manages a fuel control system or powertrain of the vehicle. Generally, the control module implements a control program and may include a boot program, an application program, and calibration data. The memory may be erased and/or rewritten in order to replace or update the control program.

Referring now to FIG. 1, a control module management system 10 includes one or more control modules 12-1, 12-2, 12-3, . . . , and 12-x, referred to collectively as control modules 12. The control modules 12 communicate with various vehicle components 14-1, 14-2, 14-3, . . . , and 14-y, referred to collectively as vehicle components 14. The control modules 12 communicate with the other control modules 12 via a communication interface, such as a vehicle communication bus 16. A data rewriting device 18 uses the vehicle communication bus 16 to communicate with the control modules 12. For example, the data rewriting device 18 may rewrite (i.e. erase or update) the control program of the control module 12-1. Additionally, the data rewriting device 18 may communicate with the control module 12-1 to determine information about the control program currently residing thereon. The control program may include information that is indicative of itself or the control module 12-1. For example, the information may include, but is not limited to, software versions of the boot program, application program, or calibration data, dates of previous programming events, and/or hardware information.

SUMMARY OF THE INVENTION

A memory system comprises a first memory that is non-volatile, that is rewritable, and that stores a control program and identification data. A second memory is non-volatile. A control module transfers the identification data to the second memory, erases the first memory, rewrites the control program to the first memory, and transfers the identification data from the second memory to the first memory after erasing the first memory.

Further areas of applicability of the present invention will become apparent from the detailed description provided hereinafter. It should; be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
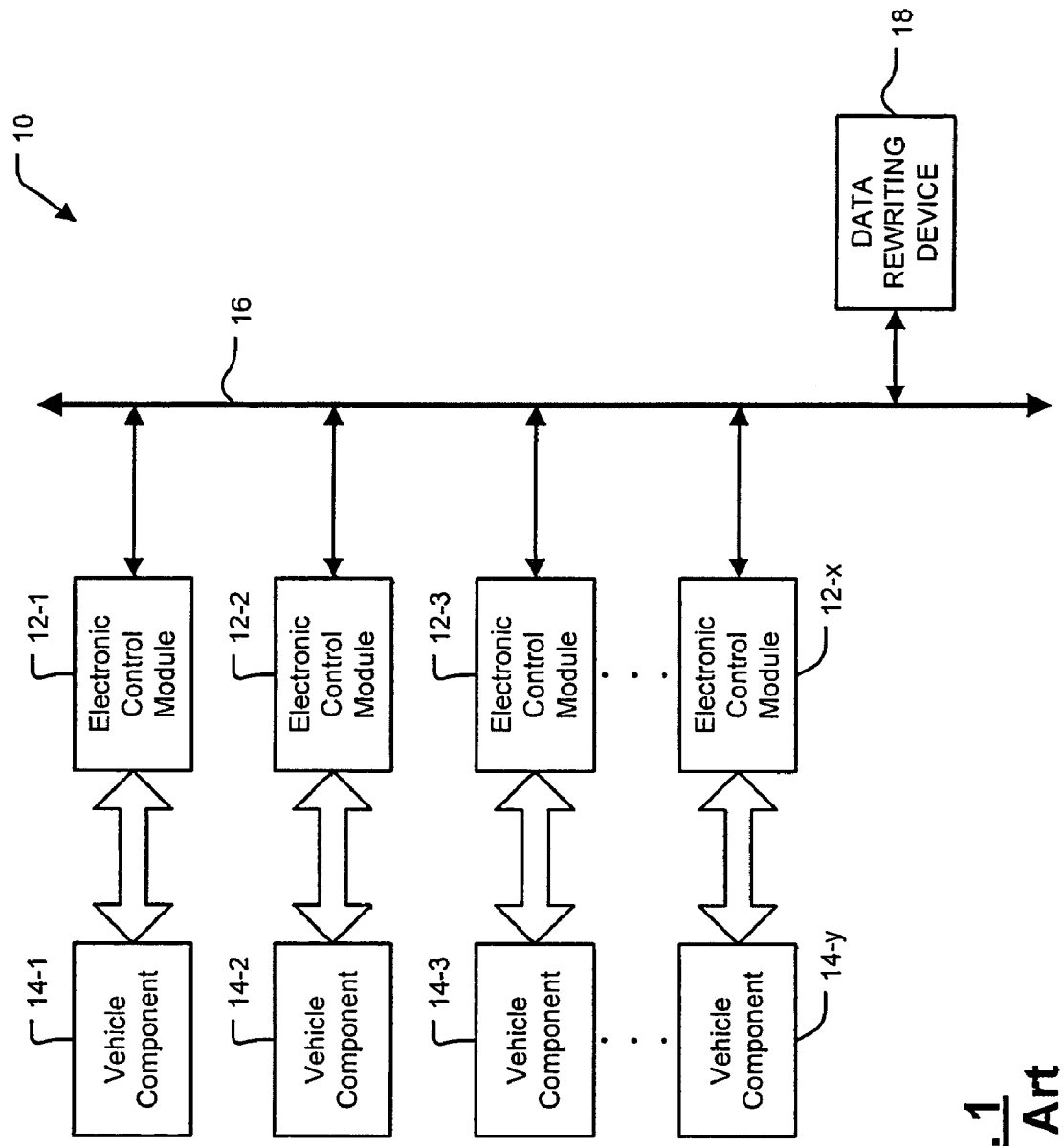
FIG. 1 is a functional block diagram of an control module management system according to the prior art.

The following description of the preferred embodiment(s) is merely exemplary in nature and is in no way intended to limit the invention, its application, or uses. For purposes of clarity, the same reference numbers will be used in the drawings to identify similar elements. As used herein, the term module and/or device refers to an application specific integrated circuit (ASIC), an electronic circuit, a processor (shared, dedicated, or group) and memory that execute one or more software or firmware programs, a combinational logic circuit, and/or other suitable components that provide the described functionality.

Figure 2:
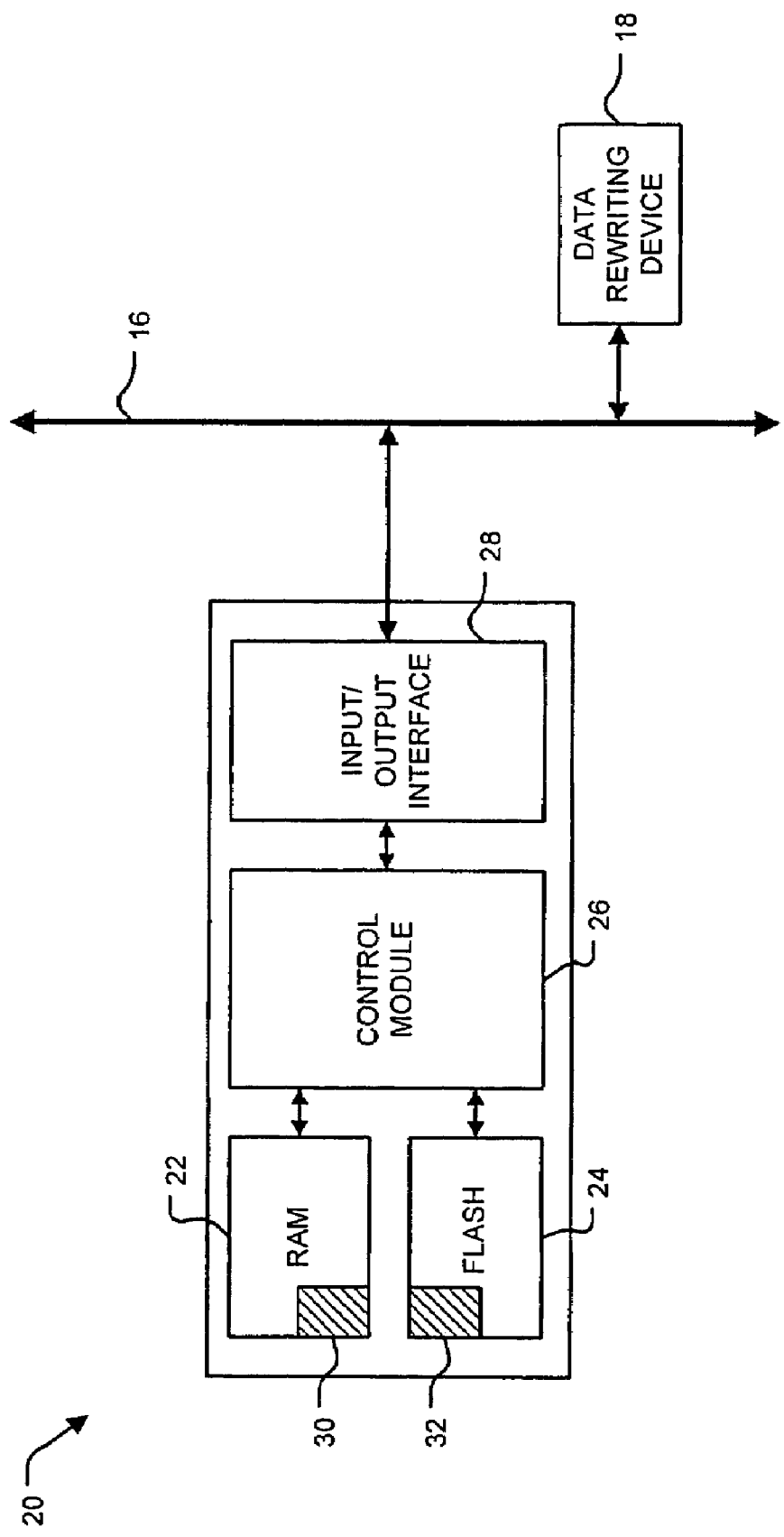
FIG. 2 is a functional block diagram of a control module that includes a control module identification block in flash memory according to the present invention.

Referring now to FIG. 2, a control module 20 includes a volatile memory or random access memory (RAM) module 22, a non-volatile memory or flash memory module 24, a control module 26, and an input/output interface 28. While not shown, the control module 20 may also include a power supply module and other standard components. The control module 26 operates according to one or more programs that may be located in the RAM module 22, the flash memory module 24, or other memory. In other words, the RAM module 22 and the flash memory module 24 store programs and/or data used for executing programs with the control module 26.

The flash memory module 24 is non-volatile read-only memory. Those skilled in the art can appreciate that a hard disk drive (HDD) or other suitable non-volatile memory may replace the flash memory module 24. The flash memory module 24 includes rewritable and non-rewritable regions. A boot program is stored in the non-rewritable region. Generally, the boot program is executed upon power-up or resetting of the control module 20 (i.e. the control module 20 is in a "boot mode"). The control module 26 performs initial processing with the boot program while the control module 20 is in the boot mode. For example, the boot program may determine whether proper application or calibration data is present. Additionally, the boot program may verify the integrity of the application software or calibration data. If the boot program verifies the presence and integrity of all required software and/or data, the control module 26 executes the application program (i.e. the control module is in an "application mode"). In other implementations, the boot program may be stored in a rewritable region.

The application programs and/or calibration data is stored in the rewritable region of the flash memory module 24. The data rewriting device 18 communicates with the control module 20 via the bus 16 and the input/output interface 28 in order to erase or rewrite the programs stored in the flash memory module 24.

The RAM module 22 stores temporary data used by the control module 26. For example, the RAM module 22 may store results of computations for the application program. Generally, the RAM module 22 is volatile memory, and the contents of the RAM module 22 are lost upon shutdown and/or re-initialized (e.g. written to zero) upon reset of the control. module 20. However, the RAM module 22 may include a temporary memory region 30 for preserving permanent data. Certain data may be stored in the temporary memory region 30 during the operation of the control module 20. The data is then transferred to an available region of the flash memory module 24 prior to shutdown of the control module 20. In this manner, the data stored in the temporary memory region 30 is preserved in the flash memory module 24 before the RAM module 22 is erased.

The flash memory module 24 includes a non-rewritable control module identification (ID) flash block 32. The control module ID flash block 32 may be incorporated within the non-rewritable region that stores the boot program. Alternatively, the control module ID flash block 32 may be an independent non-rewritable region. In one implementation, the non-rewritable region is a physically rewritable region of the flash memory module 24. However, the control module 26 and/or the boot program limits the ability of the data rewriting device 18 to erase or rewrite the non-rewritable region. In another implementation, the non-rewritable region is an independent read-only memory (ROM) module.

The control module ID flash block 32 stores identification information about the control module 20 and/or information about the boot software, application software, and calibration data. For example, the control module ID flash block 32 may store information about the hardware components of the control module 20, such as part numbers and manufacturing dates. Additionally, the control module ID flash block 32 may store software version numbers and programming dates.

The identification information stored in the control module ID flash block 32 may be used for diagnostic, upgrade, and/or repair purposes. Software or hardware updates may be available for the control module 20. The data rewriting device 18 provides options to rewrite the control module 20 according to the identification information. For example, the data rewriting device 18 determines whether the current software is outdated, and enables a user to rewrite the control module 20 with up-to-date software. In other features, the data rewriting device 18 is able to determine whether the current application and calibration software are compatible.

Generally, the control module 20 begins in the boot mode and transitions to the application mode after successful verification of the application program as described above. However, during reprogramming, the control module 20 remains in the boot mode until the flash memory module 24 is rewritten. After successful reprogramming of the flash memory module 24, the control module 20 transitions to the application mode for standard operation.

Data contained within the application program is not available to the data rewriting device 18 during reprogramming (i.e. during the boot mode). When reprogramming is initialized, the application program is erased from the flash memory module 24 in preparation for rewriting the new application program. Conventionally, the control module identification information is stored within the application program. Therefore, the control module identification information is unavailable after reprogramming begins. If the reprogramming fails for any reason, the control module 20 is unable to transition from the boot mode to the application mode until a subsequent reprogramming attempt succeeds. In other words, the control module 20 is stuck in the boot mode and any information stored in the application program is unavailable to the data rewriting device 18.

The control module 20 of the present invention stores the control module identification information in the non-rewritable control module ID flash block 32 so that the control module identification information is available during the boot mode. If a reprogramming attempt fails and the application program is erased, the data rewriting device 18 is still able to determine the control module identification information from the control module ID flash block 32.

Figure 3:
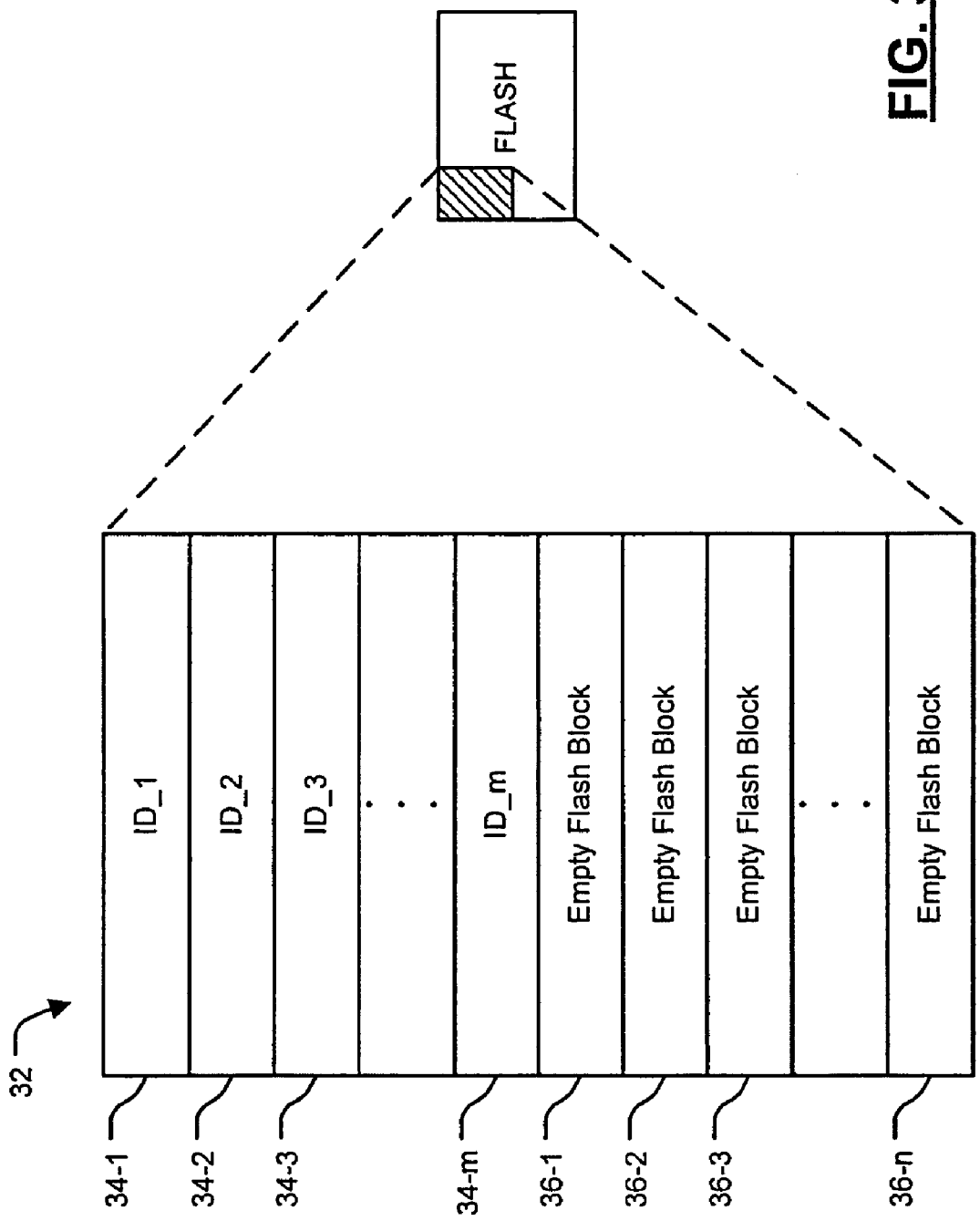
FIG. 3 illustrates a control module identification block of flash memory according to the present invention.

Referring now to FIG. 3, a control module ID flash block 32 is shown. The control module ID flash block 32 includes a plurality of control module IDs 1, 2, 3, ..., and m located in ID flash blocks 34-1, 34-2, 34-3, ..., and 34-m, respectively. Each ID represents control module identification information from previous reprogramming sessions. The control module ID flash block 32 also includes empty memory blocks 36-1, 36-2, 36-3, ..., and 36-n for-storing future control module IDs. During a reprogramming event, the control module 20 determines a location 34-m of the latest control module ID in order to calculate a location of the first empty memory block 36-1. The control module 20 stores a new control module ID in the first empty memory block 36-1.

Figure 4:
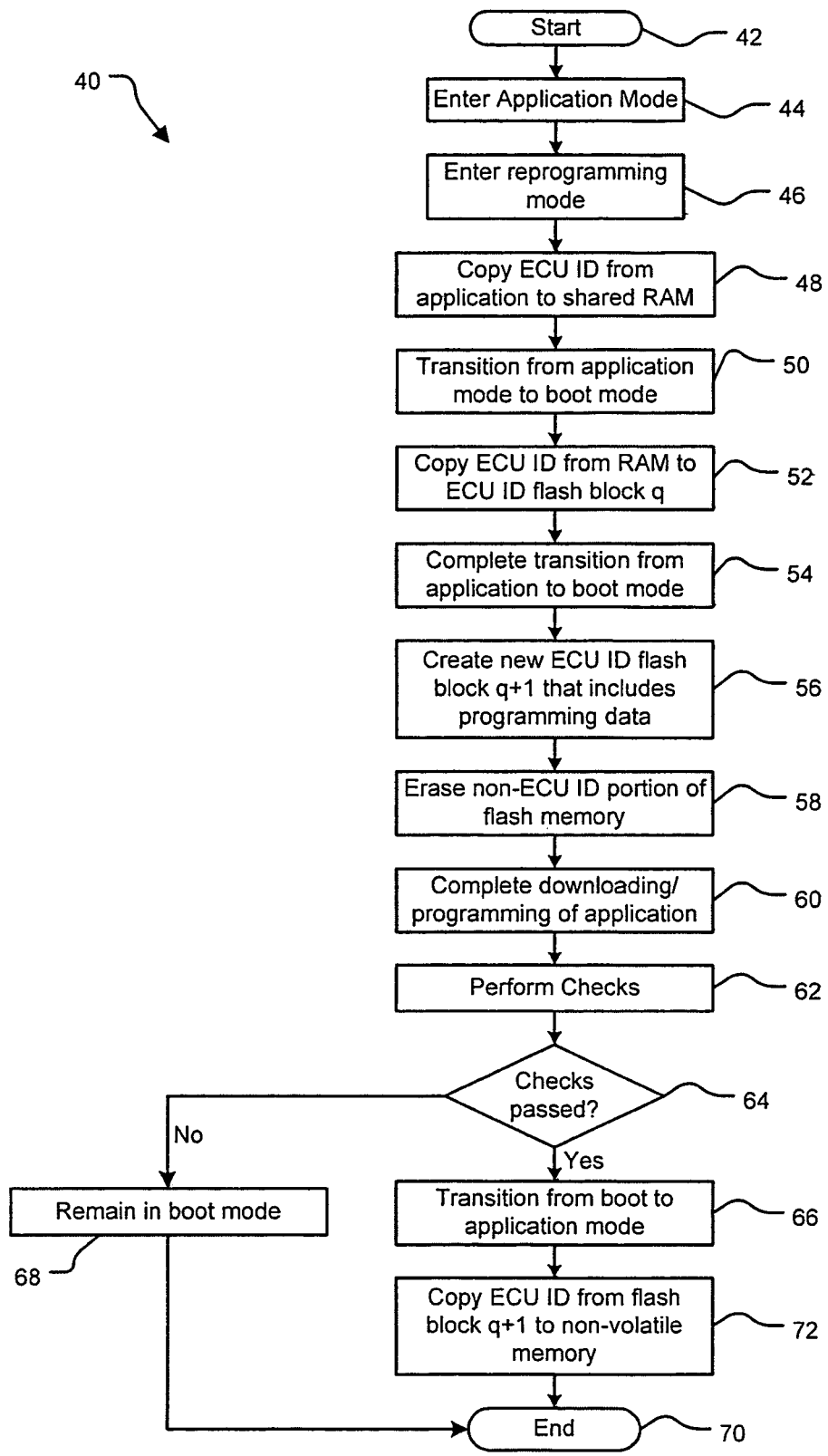
FIG. 4 is a flow diagram that illustrates steps of a method for storing control module identification data that is accessible during a boot mode of a control module according to the present invention.

Referring now to FIG. 4, a control module ID storage method 40 starts in step 42. In step 44, the control module enters the application mode. For example, the control module transitions from the boot mode to the application mode after initial power up and begins standard operation. In step 46, the control module enters a reprogramming mode. For example, the data rewriting device exchanges data with the control module to initialize reprogramming. In order for the data rewriting device to reprogram the control module, the control module must be in the boot mode.

In the application mode, the control module uses RAM to execute the application program. In order to reprogram flash memory, the control module uses RAM to execute data transfer subroutines. Therefore, the control module is not able to use RAM in order to write to the ID flash block (i.e. to reprogram the flash memory) while in the application mode. Instead, the control module uses RAM to store the control module ID during the transition to the boot mode. In step 48, the current control module ID is transferred from the current application program into a shared RAM location. In other implementations, the method 40 may omit step 48. For example, the control module may simultaneously use RAM to execute the application program while executing the data transfer subroutines. In this manner, the control module is able to transfer the current control module ID directly to the ID flash block.

In step 50, the control module begins a transition from the application mode to the boot mode. In step 52, the current control module ID is transferred from the shared RAM location to an available ID flash block q during the transition to the boot mode. In step 54, the control module completes the transition to the boot mode. After successful transition to the boot mode, the control module may inform the data rewriting device that reprogramming may continue.

In step 56, a new control module ID is created in ID flash block q+1. The new control module ID includes the identification information stored in the ID flash block q, plus additional information. For example, the additional information may include, but is not limited to, a repair location and/or a reprogramming date. If step 56 fails for any reason, the control module ID stored in ID flash block q is still available to the data rewriting device. In step 58, the data rewriting device erases the flash memory module. In other words, the data rewriting device erases all software located in the rewritable regions of the flash memory module. Any data stored in the ID flash blocks is retained. If reprogramming fails or is interrupted, the control module must be reset in the boot mode, and is unable to transition to the application mode. However, the control module ID stored in the ID flash blocks is still accessible.

In step 60, the data rewriting device completes the reprogramming. For example, the data rewriting device completes downloading/programming the control module with new application and/or calibration software. In step 62, the method 40 performs integrity and/or compatibility checks. For example, the method 40 performs a checksum routine as is known in the art. Additionally, the method 40 may determine compatibility between the application software and the calibration software. In step 64, the method 40 determines if the checks passed. In one implementation, the method 40 updates the control module ID stored in the ID flash block q+1 to indicate that reprogramming is complete and integrity checks are being performed. The method 40 updates the control module ID again when the checks are complete. The data rewriting device then checks the control module ID to determine if the checks passed. If true, the method 40 continues to step 66. If false, the method continues to step 68.

In step 68, the control module remains in the boot mode because one or more of the checks performed in step 64 failed. The method 40 then continues to step 70 and terminates. Subsequently, the control module may be reset for additional reprogramming attempts. The control module begins in the boot mode, and the data rewriting device is able to acquire control module ID data from the control module ID flash block q and/or the ID flash block q+1.

In step 66, the control module transitions from the boot mode to the application mode. In step 72, the most current control module ID (i.e. the control module ID stored in the ID flash block q+1) is transferred to non-volatile memory. Alternatively, only specific elements of the most current control module ID, such as the elements that may need to be accessed during the application mode, are transferred to non-volatile memory. In one implementation, the control module ID is transferred to the temporary memory region 30 as shown in FIG. 2. The control module continues operating in the application mode, and the method terminates in step 70.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A memory system comprising:
    a first memory that is non-volatile, that is rewritable, and that stores a control program and identification data;
    a second memory that is non-volatile; and
    a control module that transfers the identification data to the second memory, that erases the first memory, that rewrites the control program to the first memory, and that transfers the identification data from the second memory to the first memory after erasing the first memory.

2. The memory system of claim 1 wherein the second memory is not rewritable.

3. The memory system of claim 1 further comprising a memory module that includes the first memory and the second memory.

4. The memory system of claim 3 wherein the memory module is a flash memory module.

5. The memory system of claim 1 further comprising a third memory, wherein the control module transfers the identification data from the first memory to the third memory, and then transfers the identification data from the third memory to the second memory.

6. The memory system of claim 5 wherein the third memory is volatile.

7. The memory system of claim 6 wherein the third memory is RAM.

8. The memory system of claim 1 wherein the first memory stores a boot program.

9. The memory system of claim 8 wherein the control module has a first mode and a second mode.

10. The memory system of claim 9 wherein the control module transitions from the first mode to the second mode after transferring the identification data to the second memory, and transitions from the second mode to the first mode after rewriting the control.

11. The memory system of claim 10 wherein the control module executes the control program in the first mode and executes the boot program in the second mode.

12. The memory system of claim 1 wherein the identification data includes at least one of a software version identifier, a programming date, and/or a part number.

13. A control module that comprises the memory system of claim 1.

14. A memory system comprising:
    a first memory that is non-volatile, that is rewritable, that stores a control program and a boot program, and that stores identification data;
    a second memory that is non-volatile and that is not rewritable; and
    a control module that has a first mode and a second mode, that executes the control program in the first mode and executes the boot program in the second mode, that transfers the identification data from the first memory to the second memory, that transitions from the first mode to the second mode, that erases the first memory and rewrites the control program, that transitions from the second mode to the first mode, and that transfers the identification data from the second memory to the first memory.

15. A memory system comprising:
    a first memory that is non-volatile, that is rewritable, that stores a control program and a boot program, and that stores identification data;
    a second memory that is non-volatile and that is not rewritable;
    a third memory that is volatile; and
    a control module that has a first mode and a second mode, that executes the control program in the first mode and executes the boot program in the second mode, that transfers the identification data from the first memory to the third memory, that transitions from the first mode to the second mode, that transfers the identification data from the third memory to the second memory, that rewrites the control program, that transitions from the second mode to the first mode, and that transfers the identification data from the second memory to the first memory.

* * * * *